Jan. 30, 1968 D. M. CONTE 3,365,745
MOISTENER
Filed Oct. 23, 1965
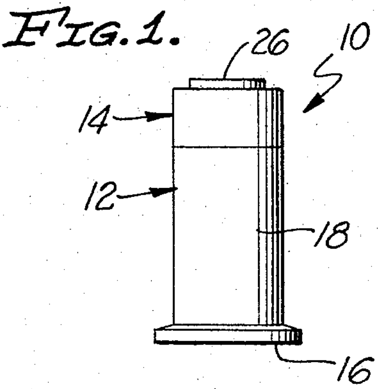
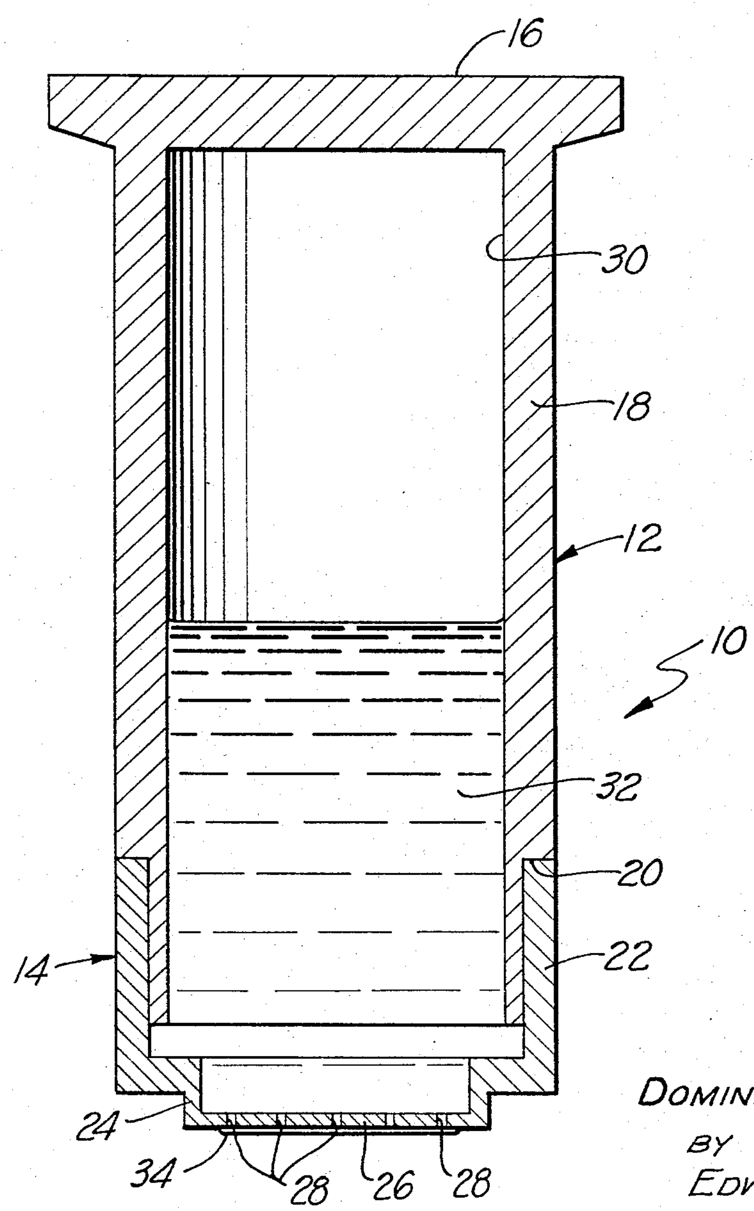
INVENTOR
DOMINIC M. CONTE
BY
EDWARD D. O'BRIAN
ATTORNEY United States Patent Office 3,365,745

Patented Jan. 30, 1968

3,365,745

MOISTENER

Dominic M. Conte, 1338 Petal Place, Anaheim, Calif. 92805

Filed Oct. 23, 1965, Ser. No. 503,155
1 Claim. (Cl. 401—266)

ABSTRACT OF THE DISCLOSURE

A moistener which includes a container having a wall portion containing a plurality of holes for dispensing liquid from the container. The thickness of the container wall portion containing the holes and the diameter of the holes being related to the physical properties of the liquid in the container so that liquid will flow through the holes and adhere to the external surface of the wall until removed from the surface.

This invention pertains to a new and improved moistener which is primarily intended to be used in applying water to stamps, adhesive coated labels and the like.

It is common knowledge that it is unpleasant to apply water to stamps, adhesively coated labels and the like utilizing the tongue. As a result of this a number of efforts have been made at developing various specific moistening appliances such as devices utilizing rollers, utilizing sponges and various other expedients. Many of these moisteners have proved to be of utility in applying liquids other than water such as various solvents and the like.

Although various prior moisteners unquestionably have utility for their intended purpose, it is considered that all of them suffer from various defects and/or limitations of various types. Many of such defects or limitations pertain to the effectiveness of such devices for their intended purpose. Others relate to various constructional problems and to cost considerations.

An object of the present invention is to provide a new and improved moistener. A more specific object of this invention is to provide an extremely simply constructed moistener which may be easily and conveniently manufactured at a nominal cost. A related object to this invention is to provide a moistener which may be easily and effectively used for its intended purposes. A further object of this invention is to provide a moistener which can be easily and conveniently disassembled and cleaned if this should become necessary.

These and other objects of this invention as well as many specific advantages of it will be more fully apparent from a detailed consideration of the remainder of this specification, the appended claims, and the accompanying drawing in which:

FIG. 1 is a side elevational view of a moistener of this invention; and

FIG. 2 is a cross-sectional view of this moistener in an inverted position ready for use.

The accompanying drawing is primarily intended so as to clearly illustrate for explanatory purposes a presently preferred embodiment or form of a moistener of this invention. It will be realized from a consideration of this specification that various moisteners falling within the scope of the appended claims can be designed on the basis of the specific moistener herein shown and described through the exercise of routine engineering skill.

As an aid to understanding this invention it can be stated in essentially summary form that it involves a moistener which includes: a container having a wall separating the interior of the container from the exterior of it, this wall containing a plurality of holes. In a moistener of this invention the thickness of the wall and the diameters of the holes are related to the physical properties of the liquid to be used with the moistener and the material at the surface of the wall and the holes in such a manner that when the container is held so that the wall is the lowermost part of the container the liquid will flow through the holes and adhere to the external surface of the wall until it is removed from the surface, as for example during a moistening operation.

The actual nature of this invention is best more fully explained by referring to the accompanying drawing in which there is shown a presently preferred embodiment of a moistener 10 of this invention. This moistener 10 consists of two parts, a base 12 and a top 14. The base 12 has a bottom 16 which supports a circular side wall 18 having a stepped shoulder 20. The top 14 has a dependent skirt 22 which is adapted to fit closely against the stepped shoulder 20 and the wall 18 so as to form a fluid tight connection. This connection is preferably of a "pressed fit" character; various other equivalent connections such as are commonly used in attaching bottle caps to containers can be employed.

The skirt 22 carries an internal flange 24 which in turn carries a wall 26 extending completely across the top of the top 14. In effect this wall 26 projects from the remainder of the top 14. It will be noted that the wall 26 is flat and that it contains a plurality of holes 28. These holes 28 may be spaced in any desired manner or pattern. In the moistener 10 when the top 14 is located upon the base 12 these two parts define a container having an internal cavity 30 which is adapted to be at least partially filled with a liquid 32. The liquid 32 may be inserted in the cavity 30 by removing the top 14 from the base 12 filling the cavity 30 and then replacing the top 14.

The moistener 10 is designed so that during use it may be inverted as shown in FIG. 2 of the drawing so that the top 14 is at the bottom of the moistener 10 and so that the wall 26 is the lowermost portion of this moistener. In this position the liquid 32 will cover the internal surface of the wall 26 and there will be a tendency for a comparatively small vacuum to be formed in the cavity 30 upon inversion of the moistener 10 tending to prevent the liquid 32 from flowing through the hole 28.

The moistener 10 is preferably constructed as hereinafter indicated so that some of this liquid 32 will flow through the holes 28 and adhere to the exposed surface of the wall 26. Such adherent or exposed liquid is designated by the number 34. Such exposed liquid 34 may be removed from the moistener 10 by merely sliding the moistener 10 over a surface to be moistened such as the back of a stamp, a gummed label or the like. As this occurs additional liquid 32 will flow through the holes 28 to the exposed surface of the wall 26 so that a substantially uniform film of liquid will be deposited during the use of the moistener 10.

In developing a moistener such as the moistener 10 for use with common water it has been discovered that that dimensions of the wall 26 are extremely critical and with the dimensions of the holes 28 are also critical in obtaining the desired results. It is presently believed that this wall should be from $\frac{20}{1000}$ to $\frac{25}{1000}$ of an inch thick and that the holes should be from $\frac{15}{1000}$ to $\frac{18}{1000}$ of an inch in diameter. Presently preferred results are achieved when the holes are $\frac{17}{1000}$ of an inch in diameter. These results are achieved when both the top 14 and the base 12 are made out of such common material as aluminum or various "plastic" materials such as various known machineable plastics as are commonly available. These results were achieved with a moistener having an internal diameter of about $\frac{5}{8}$ inch and having a cavity height of about $1\frac{3}{4}$ inches.

It is considered that these results are related to the dimensions of the cavity used, the thickness of the wall corresponding to the wall 26, the sizes and shapes of the holes corresponding to the holes 28, the physical properties of the liquid to be handled with a moistener corresponding with moistener 10 and to the material at the surfaces of the walls and the holes which are contacted by the liquid. Those skilled in the art will be able to duplicate the results achieved with the precise moistener 10 described with a minimum of routine experimentation by keeping these factors in mind when designing other differently shaped moisteners and/or moisteners for use with other liquids than water. Such experimentation is considered to be much more satisfactory in developing moisteners falling within the scope of this invention than attempts at relatively complex calculations involving factors such as surface tension, capillary attraction, adhesion, fluid viscosity and the like. All of such factors undoubtedly play a role in making moisteners of this invention operate satisfactorily.

From the foregoing description those skilled in the art pertaining to these factors and those skilled in the moistener art will realize that a moistener as herein described in a very simple effective inexpensive structure. Because of the nature of this invention it is to be considered as being limited solely by the appended claim forming a part of this disclosure.

I claim:

1. A moistener for use in spreading water upon a surface which comprises:

a base and a top defining a container which is adapted to hold water, said base having a bottom and side wall means extending around said bottom, said top having a dependent skirt fitting closely against and engaging the side wall means of said base so as to be in fluid type connection therewith and a wall extending across the top of said skirt, said wall being flat and being from about twenty to twenty-five one thousandths of an inch thick, a plurality of holes located within said wall adjacent to one another so as to extend therethrough, said holes being from about fifteen to eighteen one-thousandths of an inch in diameter, said holes constituting the only entrances to the interior of said container so that when said moistener is located with said wall being the lowermost portion of said container with water within said container, a vacuum will be formed within the interior of said container opposing the flow of water from within the interior of the container, the thickness of said wall and the diameters of said holes being related to the physical properties of water in such a manner that when the container is held so that the wall is the lowermost part of the container and water is located within said container, such water will flow through said hole and adhere the external surface of said wall until removed from the external surface of said wall.

References Cited

UNITED STATES PATENTS

| | | | |
|---|---|---|---|
| 1,197,449 | 9/1916 | Crittenden | 15—595 |
| 1,505,599 | 8/1924 | Morse | 15—595 |
| 2,896,237 | 7/1959 | Owens et al. | 15—592 |

FOREIGN PATENTS

| | | |
|---|---|---|
| 554,669 | 1/1957 | Italy. |
| 283,311 | 9/1952 | Switzerland. |

CHARLES A. WILLMUTH, *Primary Examiner.*

E. L. ROBERTS, Jr., *Examiner.*